United States Patent [19]

Ohashi

[11] Patent Number: 5,063,565
[45] Date of Patent: Nov. 5, 1991

[54] SINGLE-ERROR DETECTING AND CORRECTING SYSTEM

[75] Inventor: Takayoshi Ohashi, Tokyo, Japan

[73] Assignee: Kabushiki Kaisha Toshiba, Kawasaki, Japan

[21] Appl. No.: 688,718

[22] Filed: Apr. 23, 1991

Related U.S. Application Data

[63] Continuation of Ser. No. 289,126, Dec. 23, 1988, abandoned.

[30] Foreign Application Priority Data

Dec. 28, 1987 [JP] Japan .................................. 62-334719

[51] Int. Cl.$^5$ .............................................. G06F 11/10
[52] U.S. Cl. .................................. 371/40.2; 371/37.7; 371/40.4
[58] Field of Search ..................... 371/40.2, 40.1, 40.4, 371/13, 37.3, 37.7, 37.2, 51.1, 10.1, 10.2; 365/200

[56] References Cited

U.S. PATENT DOCUMENTS

| | | | |
|---|---|---|---|
| 3,568,153 | 3/1971 | Kurtz | 371/40.2 |
| 4,117,458 | 9/1978 | Burghard | 371/37.2 |
| 4,249,253 | 2/1981 | Gentili | 371/13 X |
| 4,319,356 | 3/1982 | Kocol | 371/13 X |
| 4,336,611 | 6/1982 | Bernhardt | 371/40.1 |
| 4,523,314 | 6/1985 | Burns | 371/40.1 |
| 4,542,454 | 9/1985 | Broich | 371/13 X |
| 4,689,792 | 8/1987 | Traynor | 371/37.2 |
| 4,701,915 | 10/1987 | Kitamura | 371/13 |
| 4,800,563 | 1/1989 | Itagaki | 371/40.2 X |

OTHER PUBLICATIONS

Creamer, et al., "Controlled Retry On Storage Errors", IBM TAB, vol. 11, No. 9, 2/1969 pp. 1100–1101.
Hsiao, "A Class of Optimal Minimum Odd Weight Column SEC DED Codes", IBM J. Res. Develop., pp. 395–401, Jul. 1970.

Primary Examiner—Robert W. Beausoliel
Attorney, Agent, or Firm—Finnegan, Henderson, Farabow, Garrett and Dunner

[57] ABSTRACT

A single-error detecting and correcting system includes a first memory for storing data and outputting the stored data in response to an input address applied, the data having control data and error check data, and an error detector for checking in accordance with the check data whether the control data in data read from the first memory is in error and generating an error detect signal in accordance with the result of the error checking. An error corrector has a second memory for storing correction data and responds to the errror detect signal to correct the data read from the first memory in accordance with the correction data, to set the first memory to a write mode and to write the corrected data into the first memory.

12 Claims, 4 Drawing Sheets

SINGLE-ERROR DETECTING AND CORRECTING SYSTEM

This application is a continuation of application Ser. No. 289,126, filed Dec. 23, 1988, now abandoned.

BACKGROUND OF THE INVENTION

1. Field of the Invention

The present invention relates to a single-error detecting and correcting system which can detect and corrects a single parity error in control data read out from a control data memory.

2. Description of the Related Art

As the scale and capabilities of computers expand, failures occurring in the computers become more important. Thus, various measures are taken against such failures. For example, as measures against errors in data read from a control data memory, a parity check and a SEC-DED (Single Error Correcting-Double Error Detecting) system have conventionally been used.

With a longitudinal or lateral parity checking system, the number of check bits and the amount of hardware required may advantageously be small. However, though an error can be detected, the error cannot be corrected. With the SEC-DED system, on the other hand, a single error can be corrected, but the number of check bits and the amount of hardware required increase. Increasing the number of check bits to, for example, one byte for a data part of eight bytes results in costly error detecting and correcting system which requires an expensive high-speed operational memory.

SUMMARY OF THE INVENTION

It is accordingly an object of the present invention to provide a single-error detecting and correcting system which combines expensive high-speed storage elements and inexpensive low-speed storage elements and can thus be arranged inexpensively without degrading error detecting and correcting performance.

To achieve object, the single-error detecting and correcting system includes a first memory for storing data and outputting the stored data in response to an input address, the data having control data and error check data, and an error detector for checking in accordance with the check data whether the control data in data read from the first memory contains an error and generating an error detect signal in accordance with the result of the error checking. An error corrector has a second memory for storing correcting data and responds to the error detect signal to correct the data read from the first memory in accordance with the correction data, to set the first memory to a write mode and to write the corrected data into the first memory.

As described above, according to the single-error detecting and correcting system of the present invention, a parity check is performed on data read from control data storage and, when a parity error is detected, the error can be corrected. Since the high-speed control data storage for storing the data and the low-speed correcting data storage are provided separately, the system may be constructed at low cost. In addition, since the error correction is performed by means of firmware of a service processor, complicated hardware for error correction is unnecessary and the system cost is further decreased.

DETAILED DESCRIPTION OF THE PREFERRED EMBODIMENTS

Figure 1:
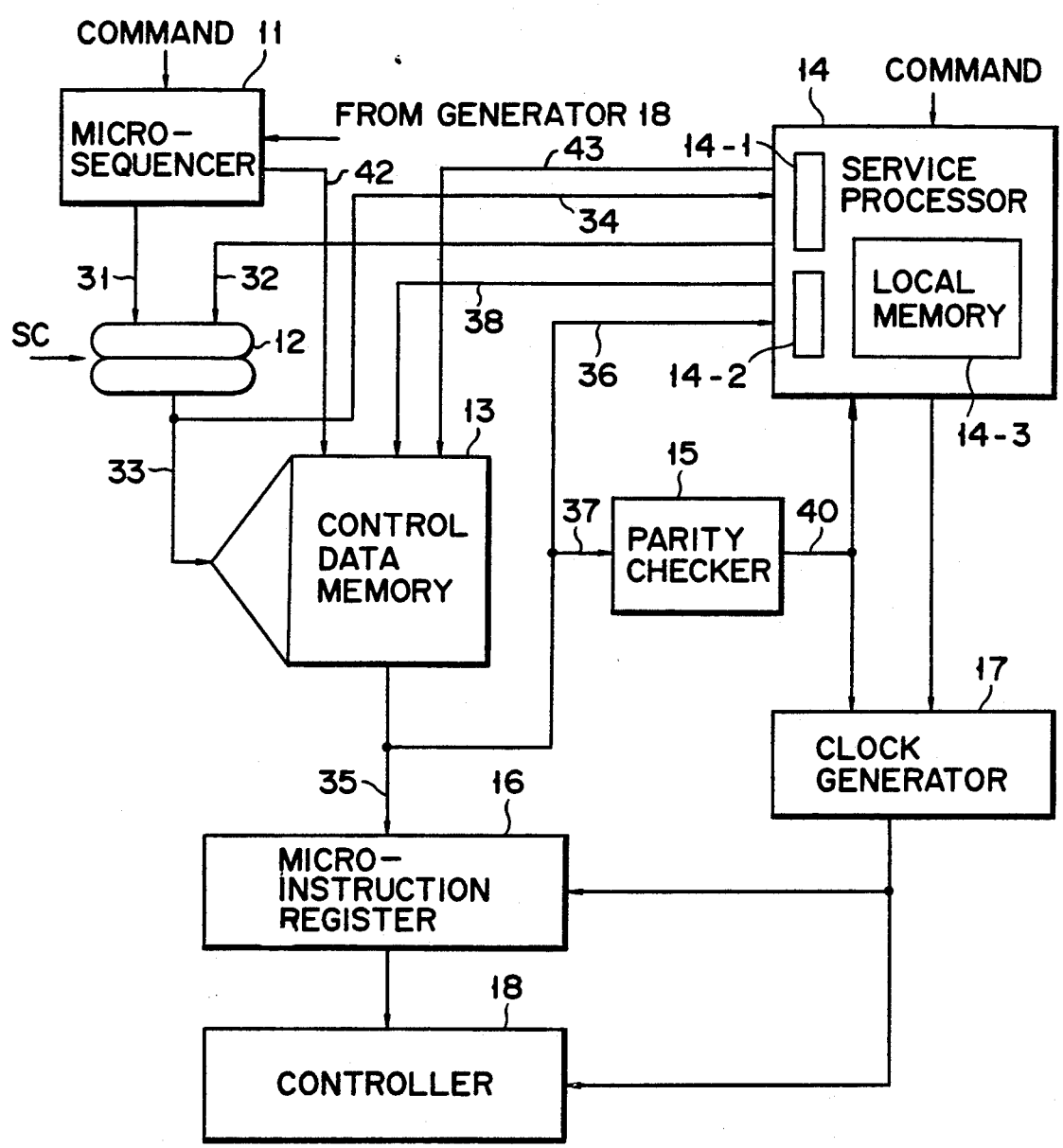
FIG. 1 is a block diagram of a single-error detecting and correcting system according to a first embodiment of the present invention.

Referring now to FIG. 1, a microsequencer 11 responds to an entered operation initiating command to set a control data memory 13 to a read mode via a line 42. Microsequencer 11 applies an address of control data memory 13 to a selector 12 via a line 31 in synchronization with a clock signal from a clock generator 17. A service processor 14 also applies an address for corrected control data to selector 12 via a line 32. Selector 12 responds to a select signal SC from service processor 14 to select the address from microsequencer 11 or service processor 14 and apply the selected address to control data memory 13 via a line 33 and to service processor 14 via a line 34. Control data read from control data memory 13 in response to the address entered in the read mode is applied to a microinstruction register 16 via a line 35, to a parity checker 15 via a line 37 and to service processor 14 via a line 36. In a write mode set by processor 14 via line 43, the corrected control data entered via a line 38 is written into control data memory 13 in accordance with the address entered via line 33. Parity checker 15 performs a parity check on control data entered via line 37 and generates an error detect signal in accordance with the checking result. The error detect signal is applied to service processor 14 and clock generator 17 via a line 40.

Clock generator 17 applies the clock signal to sequencer 11, microinstruction register 16 and controller 18. The clock generator supplies the clock signal in response to a start signal from service processor 14 and stops the supply of the clock signal in response to the error detect signal from parity checker 15.

Service processor 14 responds to the entered operation initiating, command to issue the start signal to clock generator 17. In this example the operation initiating command is entered into microsequencer 11 and service processor 14, but sequencer 11 may start service processor 14 in response to the operation initiating command. Service processor 14 contains a register 14-1 for latching the address entered via line 34, a register 14-2 for latching the control data entered via line 36 and a local memory 14-3 for storing correction data used for correcting erroneous control data. Service processor 14 responds to the error detect signal to correct the control data held in register 14-2 in accordance with the correction data stored in local memory 14-3 and to set control data memory to a write mode via line 43. Subsequently service processor 14 outputs the address held in register 14-1 to selector 12 via line 32 and the selector control signal SC to selector 12. The corrected control data is applied to memory 13 along with the address selected by selector 12. Afterward service processor 14 restarts clock generator 17.

The single-error detecting and correcting operation of the embodiment will be described hereinafter.

Figure 3:
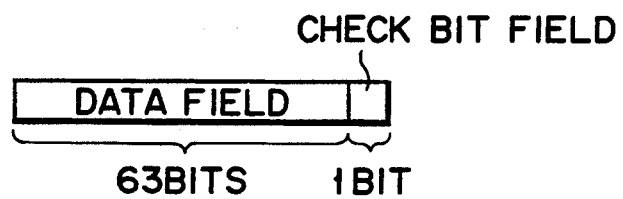
FIG. 3 shows a format of a word stored in control data memory.
Figures 4A, 4B:
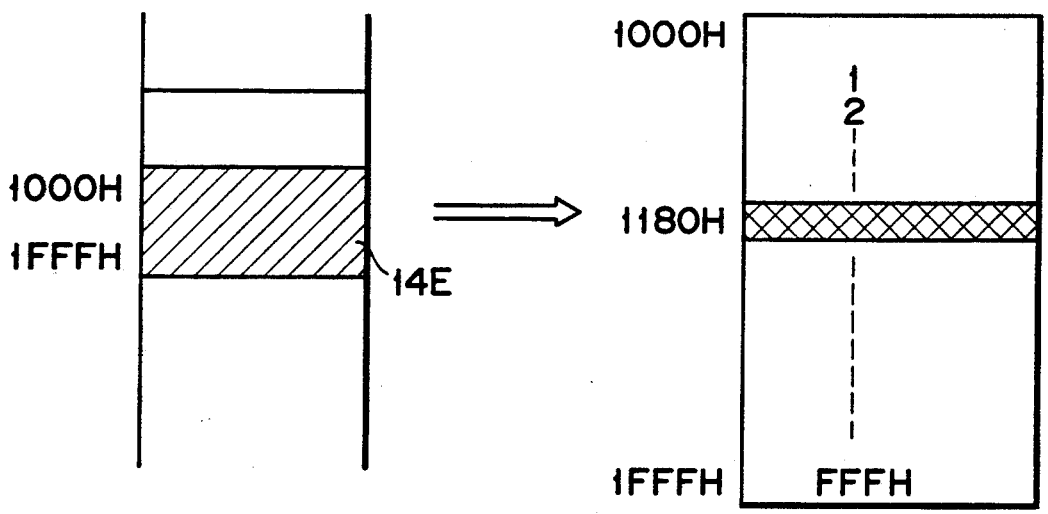
FIGS. 4A and 4B show memory maps of a local memory.

Control data memory 13 stores control data in such a format as shown in FIG. 3. In this example the control data is eight bytes (64 bits) long and has a data field of 63 high-order bits and a parity check field of one low-order bit. Unlike conventional control data, the control data thus contains no correcting data. As shown in FIG. 4A, the correction data is stored in an area 14E of local memory 14-3 in service processor 14.

Figure 2:
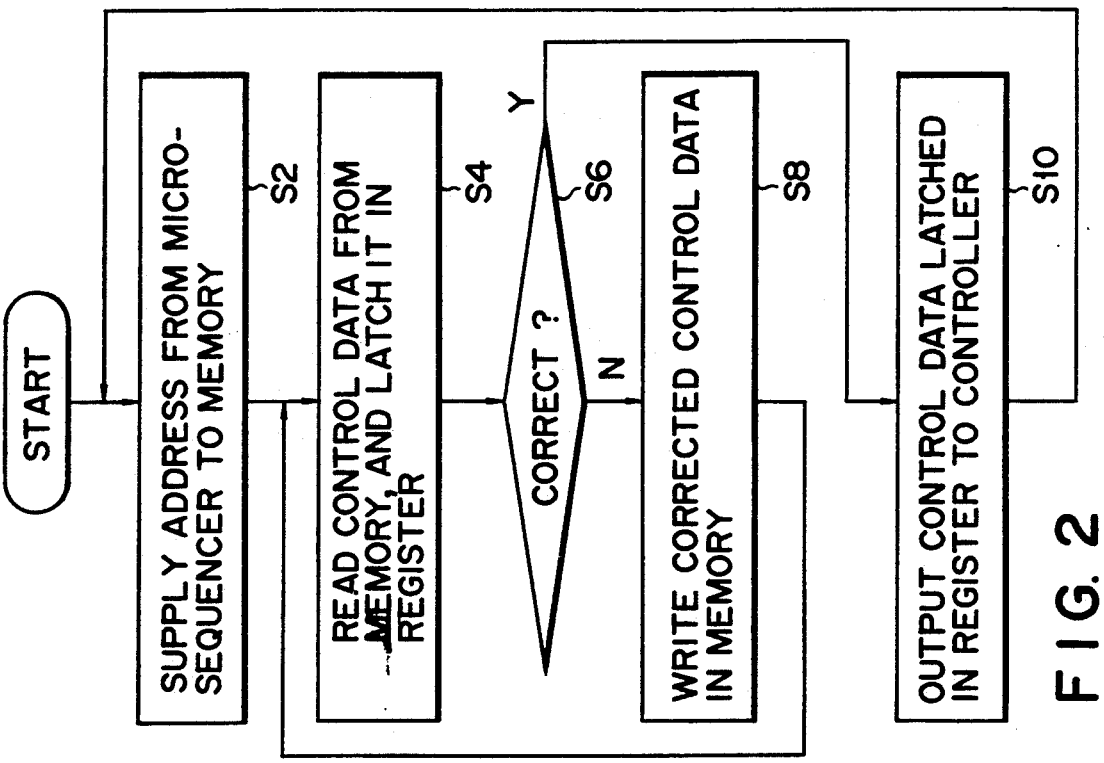
FIG. 2 is a flowchart for explaining the operation of the first embodiment.

Referring next to FIG. 2, microsequencer 11 sets control data memory 13 to a read mode via line 42 and applies an address to selector 12 in the read mode. Selector 12 responds to select signal SC from service processor 14 to select and apply the address from microsequencer 11 to control data memory 13 via line 33 and to service processor 14 via line 34. In processor 14 register 14-1 latches the address.

In step S4 the control data is read from control data memory 13 in accordance with the address from sequencer 11. The control data is then applied to processor 14 via line 36 and held in register 14-2. The control data is also applied to parity checker 15 via line 37 so as to check whether the control data is in error. If the parity checking indicates no error, the control data is written into microinstruction register 16 in response to the clock signal from clock generator 17. When an error is detected, an error detect signal is generated and applied to clock generator 17 and service processor 14. Clock generator 17 responds to the error detect signal from parity checker 15 to stop the supply of the clock signal. Hence the control data read from memory 13 cannot be written into register 16.

Where a parity error is detected in the control data stored in address "180"H of control data memory 13, in step S8, service processor 14 responds to the error detect signal to read the correction data stored in address "1180"H, in area 14E of local memory 14-3, corresponding to address "180"H held in register 14-1, and to correct the control data held in register 14-2 in accordance with the correction data and set control data memory 13 to a write mode via line 43. Afterward service processor 14 applies address "180"H held in register 14-1 and selects control signal SC to selector 12 via line 32. The corrected control data is applied to memory 13 along with the address selected by selector 12, in step S8 so that the control data is written into the memory. Thus, the control data in control data memory 13 is corrected.

Subsequently, control return to step S4, service processor 14 sets memory 13 to a read mode via line 43 and issues address "180"H held in register 14-1 to selector 12 via line 32. Selector 12 responds to select control signal SC to select the address from processor 14 and apply the address selected to, memory 13. Processor 14 instructs clock generator 17 to operate again. Consequently the control data read from address "180"H of memory 13 is latched by register 16.

In step S10 the control data held by register 16 is applied to controller 17 in accordance with the clock signal from clock generator 17. Subsequently the clock signal is applied to sequencer 11 as well with the result that the next address is output therefrom.

In this example the mode of operation of control data memory 13 is controlled by microsequencer 11 and service processor 14. Alternatively, memory 13 may be controlled by service processor 14 only.

Figure 5:
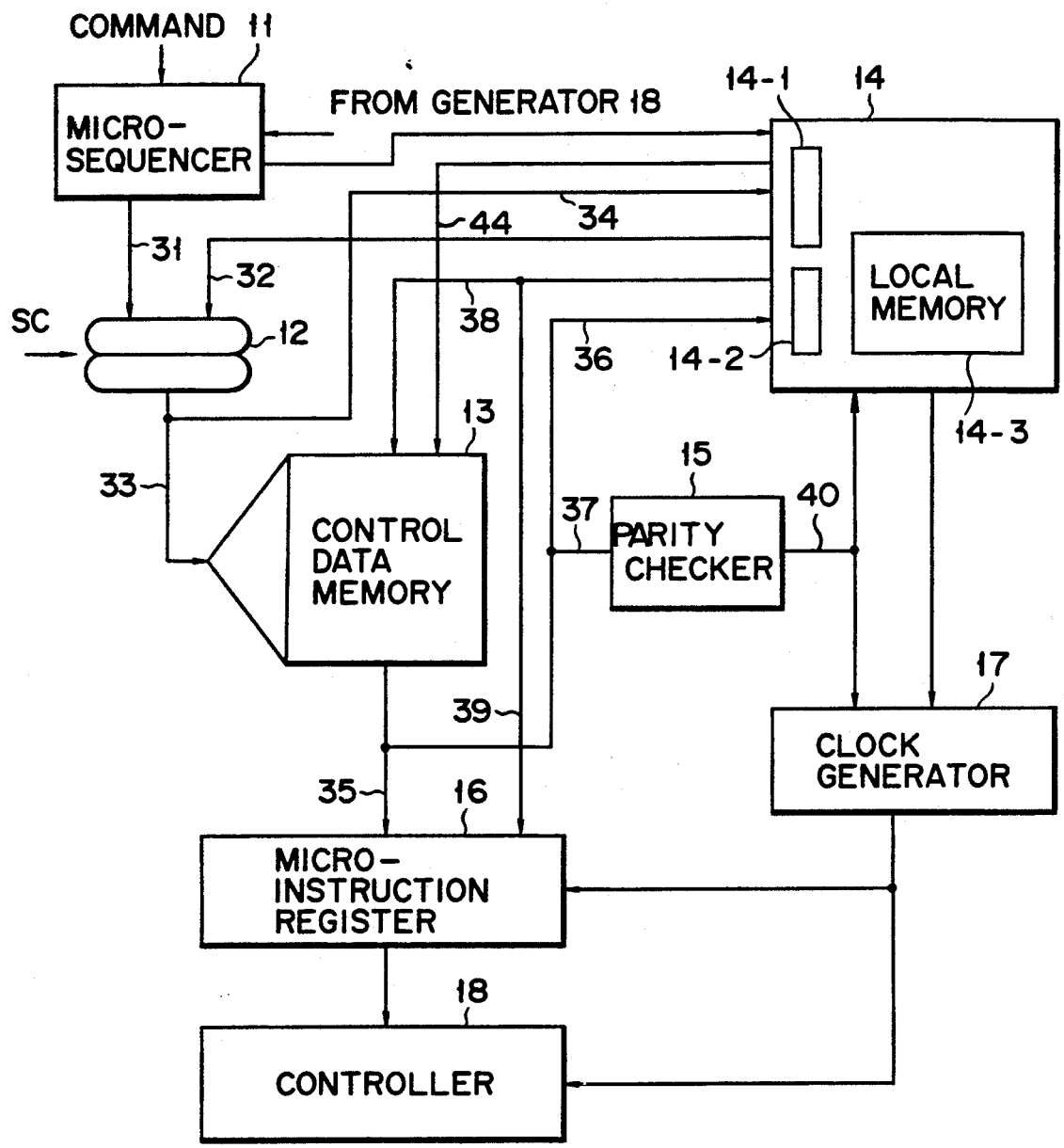
FIG. 5 is a block diagram of a single-error detecting and correcting system according to a second embodiment of the present invention.

Next, a second embodiment of the single-error detecting and correcting system according to the present invention will be described with reference to FIG. 5.

Figure 6:
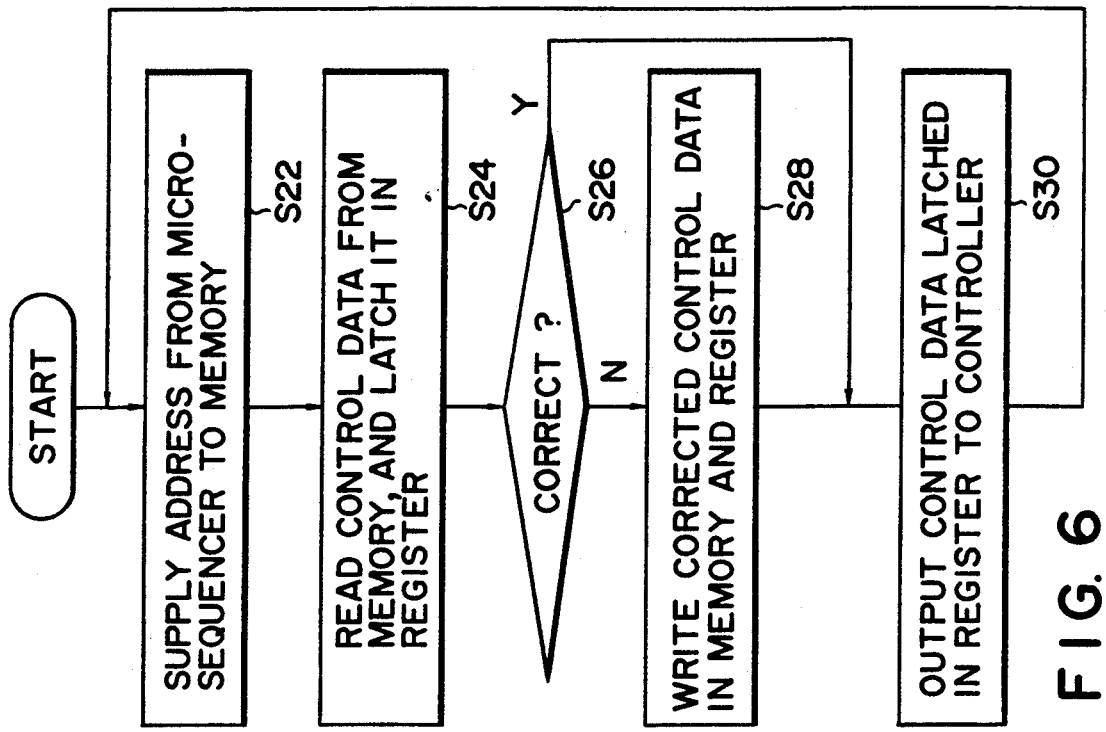
FIG. 6 is a flowchart for explaining the operation of the second embodiment.

The second embodiment is substantially the same as the first embodiment in arrangement and thus the description of different points alone will be described with reference to FIG. 6. In the second embodiment, the corrected control data held in register 14-2 is applied not only to memory 13 via line 38 but also to microinstruction register 16 via line 39, in step S28. To this end, processor 14 instructs clock generator 17 to operate again when the corrected control data is written into memory 13. In response to, the instruction of processor 14, clock generator 17 provides the clock signal to microinstruction register 16 alone. Consequently microinstruction register 16 can latch the corrected control data. Thereafter the clock signal is applied to sequencer 11 and controller 18 as well as in the first embodiment.

As apparent from the above description, according to the second embodiment, after the corrected control data has been written into memory 13, the data does not need to be read out, thereby achieving high-speed processing function. The second embodiment may be applied to the case where memory 13 is not a RAM but a ROM. In this case hardware used for writing the corrected control data into memory 13 is unnecessary.

I claim:

1. A system for detecting and correcting single-bit error, comprising:
    first storage means for storing data and outputting the data in response to an input address in a read mode, the data comprising control data and check data;
    error detecting means for checking in accordance with the check data whether the control data in the data read from said first storage means contains an error and generating an error detect signal in accordance with the result of the error checking; and
    correcting means, responsive to the error detect signal from said error detecting means and having second storage means for storing a single error correction-double error detection (SEC-DED) code, for correction the data from said first storage means in accordance with the SEC-DED code, setting said first storage means to a write mode and writing corrected data into said first storage means.

2. The system according to claim 1, further comprising:
    clock generating means for selectively generating a clock signal in response to the error detect signal from said error detecting means; and
    register means for holding the data from said first storage means in response to the clock signal from said clock generating means.

3. The system according to claim 2, wherein said correcting means further includes means responsive to writing of the corrected data into said first storage means, for setting said first storage means to the read mode, applying the address to said first storage means and causing said clock generating means to generate the clock signal.

4. The system according to claim 2, wherein said correcting means further includes means for writing the corrected data into said register means in response to the writing of the corrected data into said first storage means.

5. The system according to claim 1, further comprising:
   selecting means responsive to an input select control signal, for selecting one of a first address applied thereto and a second address from said correcting means and applying the selected address as the address to said first storage means, and wherein said correcting mean includes means for receiving the address from said selecting means and applying the received address to said selector means as the second address and applying the select control signal to said selecting means in response to the error detect signal.

6. The system according to claim 5, further comprising:
   microsequencer means responsive to an input operation initiating command for applying the first 7. A method of detecting and correcting a single-bit error, comprising:
   generating data stored in a first memory, in accordance with a memory address in a read mode, the data comprising control data and check data;
   checking whether the control data contains an error in accordance with the check data;
   generating an error detect signal in accordance with the result of the error checking; and
   correcting the data with a single error correction-double error detection (SEC-DED) code stored in a second memory, in response to the error detect signal.

8. The method according to claim 7, further comprising:
   holding the data in response to a clock signal; and
   selectively generating the clock signal in accordance with the error detect signal.

9. The method according to claim 7, further comprising:
   writing the corrected data into said first memory.

10. A system for detecting and correcting a single-bit error, comprising:
    first storage means for storing data and outputting the data in response to an input address in a read mode, the data comprising control data and check data;
    register means responsive to an input clock signal, for latching the data from aid first storage means;
    error detecting means for checking in accordance with the check data whether the control data in the data read from said first storage means contains an error and generating an error detect signal in accordance with the result of the error checking; and
    correcting means having second storage means for storing a single error correction-double error detection (SEC-DED) code and responsive to said error detect signal, for correcting the data from said first storage means in accordance with the SEC-DED code and for writing the corrected data into said register means.

11. The system according to claim 10, further comprising:
    clock generating means for generating the clock signal in response to an input start instruction from said correcting means and stopping the generation of the clock signal in response to the error detect signal from said error detecting means, and wherein said correcting means further comprises means responsive to the error detect signal, for generating and applying the start instruction to said clock generating means to write the corrected data into said register means.

12. The system according to claim 10, further comprising:
    microsequencer means responsive to an input operation initiating command for applying the address to said first storage means.

* * * * *

UNITED STATES PATENT AND TRADEMARK OFFICE
CERTIFICATE OF CORRECTION

PATENT NO. : 5,063,565
DATED : November 05, 1991
INVENTOR(S) : Takayoshi Ohashi It is certified that error appears in the above-identified patent and that said Letters Patent is hereby corrected as shown below:

Abstract, line 10, change "errror" to --error--.

Claim 1, column 4, line 30, after "correcting" insert --a--.

Claim 1, column 4, line 45, change "correction" to --correcting--.

Claim 5, column 5, line 8, change "mean" to --means--.

Claim 6, column 5, line 17, after "first" insert --address to said selector means.--.

UNITED STATES PATENT AND TRADEMARK OFFICE
CERTIFICATE OF CORRECTION

PATENT NO. : 5,063,565

DATED : November 05, 1991

INVENTOR(S) : Takayoshi Ohashi

It is certified that error appears in the above-identified patent and that said Letters Patent is hereby corrected as shown below:

Claim 10, column 6, line 8, change "aid" to --said--.

Claim 10, column 6, line 16, after "SEC-DED"" insert --)--.

Signed and Sealed this

First Day of June, 1993

Attest:

MICHAEL K. KIRK

*Attesting Officer*  Acting Commissioner of Patents and Trademarks